United States Patent [19]

Anderson

[11] 4,317,599
[45] Mar. 2, 1982

[54] BEARING ARRANGEMENT WITH SEPARABLE LUBRICATION COLLAR

[75] Inventor: Sidney E. Anderson, Geneseo, Ill.

[73] Assignee: Deere & Company, Moline, Ill.

[21] Appl. No.: 166,013

[22] Filed: Jul. 7, 1980

[51] Int. Cl.³ ............................................. F16C 33/66
[52] U.S. Cl. .................................... 308/187; 308/190
[58] Field of Search ...................... 308/18, 78, 92, 97, 308/187, 187.1, 189 R, 190, 240

[56] References Cited

U.S. PATENT DOCUMENTS 4,262,978  4/1981  Everett .................................. 308/187

*Primary Examiner*—Frederick R. Schmidt

[57] ABSTRACT

A cross-drilled lubrication collar clamped co-axially alongside a generally conventional self-contained sealed bearing sprocket-idler assembly of a conveyor in an agricultural machine permits supplementary lubrication of the idler bearing from an external source in situ without disassembling the bearing. Clearance between the bores of the lubrication collar and the idler inner race and the spindle supporting the two elements and providing means for clamping them together, permits lubricant introduced by way of the cross-drilling in the collar to flow along the spindle and, by way of a cross-drilling in the inner race of the idler bearing, to the bearing surfaces themselves.

8 Claims, 3 Drawing Figures

BEARING ARRANGEMENT WITH SEPARABLE LUBRICATION COLLAR

BACKGROUND OF THE INVENTION

The present invention relates to the relubrication or recharging with lubricant of bearings of rotating members as used, for example, in conveyors and drives of mobile agricultural machines such as crop harvesters and the like, and especially to relubrication of self-contained idler bearings used in such machines.

In agricultural machines, many bearings are required to operate in environments where any bearing sealing means is subject to damage and deterioration from contaminants, such as dust and moisture, or abrasive mechanical action from crop material being handled and/or soil particles disturbed by operation of the machine. In such conditions, it is not generally possible to provide seals completely effective in protecting bearings and in retaining lubricant and it becomes desirable to relubricate or recharge the bearing internally to extend its life. Preferably, this is done in situ without disassembly. In an idler assembly, for example, comprising an outer member journaled on an inner member, a common arrangement uses a special mounting bolt for securing the assembly to a frame member of a machine, the bolt being drilled and tapped and fitted with a conventional grease fitting. Thus, grease can be forced into the idler bearing by way of the drilled bolt passages and a cross-drilled passage in the inner member or race of the idler itself. Forcing lubricant, under pressure, into the cavities of the idler bearing recharges the bearing with lubricant and may flush contaminants out of the bearing area and clear of the surfaces wiped by bearing seals.

However, the drilling and cross-drilling of mounting bolts or studs or idlers is, in itself, relatively expensive and a variety of sizes and lengths must be provided to suit various installations and types of idler, potentially resulting in a significant extra inventory cost. Also, the nature of the drilled stud or bolt substantially limits the position of the grease fitting for recharging the bearing to being on an end of the stud, unless additional cost is incurred in drilling and machining special forms for the stud. A simple axial end position for the grease fitting does not always provide most convenient access for the relubrication operation.

SUMMARY OF THE INVENTION

Accordingly it is an object of the invention to provide a means for relubricating bearings, particularly idler bearings, through a simple low cost means extraneous to the bearing assembly itself and adaptable to a wide variety of installations and providing additional flexibility in location of a valve means or grease fitting included in the device and provided for facilitating the introduction of lubricant for recharging or relubricating the bearing.

According to the invention, a bearing arrangement or installation may comprise a bearing assembly, such as an anti-friction bearing, having a bearing inner member or inner race and a load carrying member journaled on it by a bearing means, such as a sealed ball bearing, the inner member being provided with a passage connecting its axial bore with the bearing means. A lubrication collar, preferably an annular member also with an axial through bore and a passage connecting that bore with an external surface of the collar, may be mounted in conjunction with the bearing assembly, on a spindle or shaft, carried by a frame member of a machine. The bores of the inner member and lubrication collar may be approximately coaxial and held in position by a clamping means which may (but not necessarily) also serve to close and substantially seal the otherwise exposed outer ends of the respecive bores, so as to create a lubricant cavity or chamber defined, at least in part, by the respective bores. Lubricant introduced into the lubricant cavity through the passage in the lubrication collar and subsequently pressurized may thus be forced through the passage in the inner member into the bearing proper. Preferably, a conventional grease fitting is fitted to the outer end of the passage in the lubrication collar for convenience in relubricating the bearing arrangement and for assisting in retaining lubricant in the lubricant cavity.

A rechargable bearing arrangement of this sort is especially adaptable to an idler installation. An idler assembly, such as a sprocket idler having its own internal bearing, may be carried on a stud or spindle or simple threaded fastener, cantilevered from a frame member, with a lubrication collar clamped adjacent the inner member of the idler.

A lubrication collar, according to the invention, may have a simple annular form, low in manufacturing cost. Without significant additional manufacturing cost, the form of the bore of the collar may depart from a simple cylindrical form to enhance its function. For example, the bore may be tapered, increasing in diameter towards the bearing inner member so as to assist the flow of lubricant from the collar to the inner member.

An advantage of a lubrication arrangement according to the invention, is the potential improvement in accessibility for relubricating that it provides. The passage in the lubrication collar may conveniently extend approximately radially although it may be inclined axially a desired or required and, in assembly, the collar may be clamped in whatever circumferential disposition is most convenient for access to the grease fitting. As is conventional, of course, grease fittings of suitable angle may still be used so as to obtain the best possible accessibility.

DESCRIPTION OF THE PREFERRED EMBODIMENT

Figure 1:
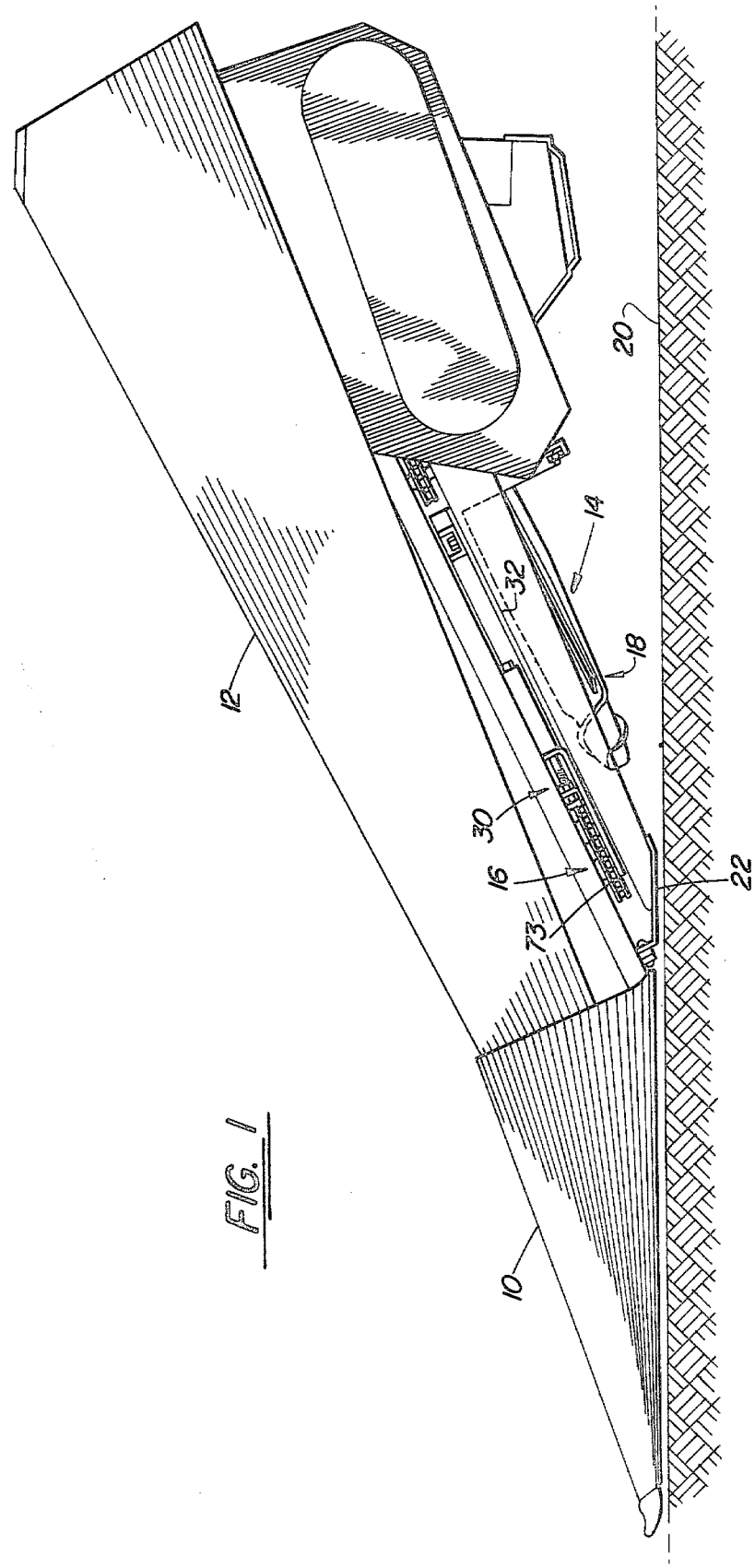
FIG. 1 is a side elevation of a corn head for a combine harvester including a gatherer chain sprocket idler assembly installation embodying the invention.

The corn head, shown in side elevation in FIG. 1, exemplifies an application and environment for a bearing arrangement embodying the invention.

The corn head is otherwise conventional and includes gatherer points 10 and gatherer sheets 12 for guiding a standing row of corn into a row unit 14 where the stalks are controlled, in part, by a gatherer chain assembly 16 while stalk or snapping rolls 18 pull the stalk downwards so that the ear is snapped from the stalk by deck plates and/or snapping bars between the gatherer chain and the rolls.

As is well known, corn heads are usually multi-row machines, but only one side of one row unit is indicated in the drawing. Typically, corn heads are operated with gatherer points 10, close to the ground 20 as indicated in FIG. 1 and a skid or shoe 22 is provided to establish a certain minimum operating height of the gatherer chain assemblies 16 and stalk rolls 18 above the ground.

Figure 2:
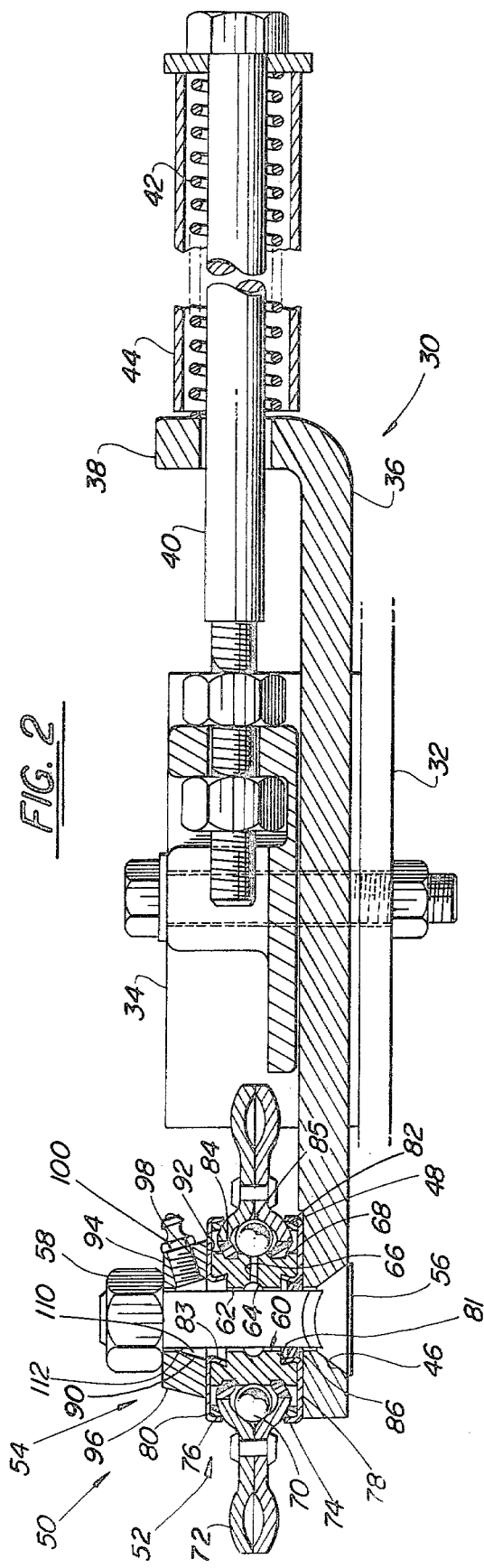
FIG. 2 is an enlarged cross-sectional view on a vertical fore-and-aft plane of the gatherer chain idler assembly installation including a spring loaded tensioning device.

The gatherer chain assembly 16 is shown only partially in FIG. 2 and with the gatherer chain removed. In particular, FIG. 2 shows a spring-loaded lower gatherer chain idler assembly 30 and a portion of a corn head frame member such as a deck plate 32, which together with a chain guide casting 34 provides support and guidance for the idler assembly 30.

The idler assembly 30 consists of a frame member or arm 36 which is bent upwards at its rearward end to form a guide 38 for its fore-and-aft movement relative to the fixed but adjustable spring spindle 40. A compression spring 42 urges the arm 36 forward (to the left in FIG. 2) to tension the gatherer chain (not shown). Varying loads on the chain or on the idler itself may force the arm rearwards compressing the spring 42 but rearward travel is limited by the spacer 44. At the forward end of the arm 36 is an idler mounting hole 46 surrounded, on the upper surface of the idler arm 36, by a seating surface 48.

Mounted on the seating surface 48 and centered on the mounting hole 46 is an idler mounting assembly 60 including the idler assembly 52, lubrication collar 54 and bolt and nut 56 and 58, respectively, serving to clamp the collar 54 and idler assembly 52 co-axially together and against the seating surface 48.

In the idler assembly 52, the clamped and stationary member is the inner member or inner race 60. It has an axial through bore 62 with an annular groove 64 and a cross-drilled hole 66 connecting the annular groove 64 to the generally cylindrical outer surface 68 of the inner race which provides a bearing surface or track for ball bearings 70, as is conventional in an anti-friction bearing of this type. Journaled on the inner race 60 by means of the balls 70 is a sprocket wheel 72 which normally carries the gatherer chain 73 (shown only in FIG. 1).

Mechanical shielding of the idler bearing area is provided by inner and outer face shields 74 and 76 respectively, each shield having a radially extending face 78 and 80 respectively, perpendicular to the axis of the bore 62 of the inner race 60 and a flanged bore 81, 83. Grease seals 82 and 84, provided on both inner and outer sides of the idler assembly, for sealing the bearing area and retaining lubricant in a lubricant space 85, are provided between the sprocket 72 and the face shields 74, 76 and between the sprocket and the inner race 60 respectively, that is at all points where relative movement takes place between adjacent surfaces. Additional lubricant sealing is provided by an O-ring 86 threaded onto the clamping bolt 56 and retained adjacent the seating surface 48 by the inner face shield 74.

In the lubrication collar 54, the frusto-conical bore 90 is tapered to a larger diameter adjacent the idler inner race 60 while the inner and outer faces, 92 and 94 respectively, are perpendicular to the bore. The outer surface 96 of the collar 54 is also frusto-conical so that the threaded passage 98, connecting the bore 90 to the outer surface 96, is approximately normal to both surfaces and provides a suitable mounting for the grease fitting 100.

Figure 3:
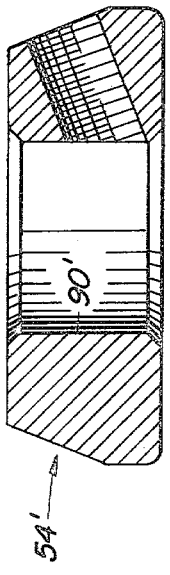
FIG. 3 is a further enlarged sectional view of an alternate embodiment of the lubrication collar included in the invention.

The lubrication collar 54, with its simple annular form, has an inherently low manufacturing cost permitting of some design variation according to considerations such as facilities available, quantities to be made and material cost and availability. In some circumstances, for example, the alternate form of collar 54' having a cylindrical bore 90' and shown in FIG. 3 may be advantageous.

In normal corn head operation, the sprocket 72, carrying the gatherer chain 73, rotates on the inner race 60 and low friction journaling is provided by the balls 70 and lubricant retained in the assembly, including the lubrication chamber 110 defined at least in part by the bores 62 and 90 of the inner race and lubrication collar respectively. The flanged bores 81, 83 of the shields 74, 76 may be considered part of the bores defining the lubricant chamber or cavity 110. The O-ring 86 thus engages one of these bores and contributes to the closing of one end of the chamber 110.

The bearing is protected and lubricant is retained internally by the several shields and seals provided and described above and by the clamping action of the bolt and nut 56, 58 inhibiting the loss of lubricant radially outwards at the faces 92, 94 and 78 and 80 of the collar 54 and inner race shields 74, 76 respectively. To recharge with lubricant and/or flush the bearing, particularly in the seal areas, lubricant is applied under pressure by conventional means through the grease fitting 100, entering the lubricant chamber 110 and being forced outwards or externally by way of the annular groove 64, and cross-drilled hole 66 to the bearing area proper. As indicated in FIG. 2, components are sized (and/or tapered as in the case of the collar 54) to provide space for the passage of lubricant generally axially along the shank 112 of the bolt 56 from the passage 98 of the collar to the passage 66 of the inner race.

As can be apreciated from FIG. 2, the potential cost reduction of using simple standard parts, such as the bolt and nut 56 and 58, along with a simple low cost part (collar 54) is obtained without significant change in bulk or overall height of idler assembly compared with the conventional axially and cross-drilled bolt or stud arrangement. The arrangement has inherently low inventory cost involving, as it does, only one special part, the collar, which however may be used in many different applications including many in which an oversize collar bore may be tolerated so that only a few sizes of collar need be made available. The range of application of a collar of a given height or thickness could, of course, be extended by interposing a washer or spacer of desired thickness between the collar and bearing inner member.

In FIG. 2, the collar is shown with the lubricant passage 98 and hence the lubricant fitting 100 in a particular location for convenience in drawing, but of course it will be realized that the freedom to choose any rotational position for the collar in combination with any standard angle of grease fitting (a straight fitting is shown in FIG. 2) has the potential for providing convenient access to the grease fitting in almost any installation or application.

The invention has been described in a particular embodiment (that of a conveyor chain idler in an agricultural machine) in a normally difficult environment where the external parts of the bearing and seals are subject to abrasion, for example, from the passage of crop material as weel as soil particles and crop dust. In this embodiment, as is indicated in FIG. 1, the corn head is typically operated with the gatherer points 10 and skid 22 close to the ground so that the idler mounting assembly 50 is relatively vulnerable. The invention, it will be clear, is applicable to many similar installations whether the bearing is that of an idler or a power transmission member such as a shaft or whether the system is for power transmission or conveying (as in the present embodiment). A particular advantage in all these potential applications is the simple low-cost provision of supplementary lubrication or recharging in situ of a standard and hence relatively low cost bearing (preferably with internal cross-drilling for a lubricant passage) by the provision of a simple low-cost part occupying only a little space such as the lubrication collar forming part of the present invention.

I claim:

1. A lubricated bearing arrangement for mounting on a spindle, rechargable with lubricant in situ, comprising:
a bearing assembly having an inner member for mounting on the spindle generally concentrically and nonrotatably with respect to said spindle, an outer member journaled on the inner member, and a bearing lubricant space between the members, the inner member having axially opposite end faces and an axial through bore for defining, in cooperation with the spindle, a first lubricant cavity, and a passage in the inner member connecting said lubricant cavity with the lubricant space;
a lubrication collar having axially opposite end faces and an axial through bore for defining, in cooperation with the spindle, a second lubricant cavity and a lubricant passage connecting said lubricant cavity with an outer surface of the lubrication collar, the collar being mountable on the spindle generally concentrically and nonrotatably and with an end face substantially abutting an end face of the inner member, the faces cooperating in a lubricant retaining relationship and the respective first and second cavities connecting one with another; and
means for closing the respective axially remote ends of the first and second lubricant cavities so that luabricant introduced into the passage of the collar flows through the cavities and through the passage of the inner member and hence into the lubricant space of the bearing assembly.

2. The bearing arrangement of claim 1 wherein the collar is rotationally adjustable relative to the inner member.

3. An idler arrangement, rechargable with lubricant in situ, for mounting on a frame member of a mobile agricultural machine, the frame member having a seating surface, comprising:
an idler assembly including an inner member and an outer member journaled on the inner member by a bearing means, the inner member having an axial through bore and a passage connecting the bore with the bearing means and opposite end faces perpendicular to the bore;
an annular lubrication collar having an axial through bore and a passage connecting the bore to an external surface of the collar and opposite end faces perpendicular to the bore;
means for clamping the idler assembly and lubrication collar together against the seating surface of the frame so that the respective bores of the collar and of the inner member are connected and approximately co-axial and perpendicular to the seating surface, so as to create a lubricant retaining cavity defined, at least in part, by the bores of the collar and the inner member; and
means for closing the axially opposite ends of the cavity so that lubricant filling the cavity and subjected to pressure by way of the passage in the collar is forced through the passage in the inner member and into the bearing means of the idler assembly.

4. The idler arrangement of claim 3 wherein the means for clamping comprises a threaded fastener secured in the frame member and having a shank extending through the bores of the inner member and the collar, the form of the shank being such as to permit the flow of lubricant from the passage of the collar to the passage of the inner member and including a nut threaded onto the shank and abutting an end face of the collar, and the means for closing the ends of the lubricant cavity include the nut adjacent the collar, and an annular seal surrounding the shank and engaging the bore of the inner member, the tightening of the nut, clamping the collar and inner member against the seating surface of the frame and substantially sealing the lubricant cavity against movement of lubricant radially outwards adjacent the end faces of the collar and inner member.

5. The idler arrangement of claim 4 wherein the axial through bore of the collar is tapered so as to increase in diameter towards the end face adjacent the inner member so as to locally enlarge the lubricant cavity and facilitate movement of lubricant from the passage of the collar to the passage of the inner member.

6. The idler arrangement of claim 3 wherein the collar is rotationally adjustable relative to the inner member.

7. The idler arrangement of claim 3 wherein the axial through bore of the inner member is provided with an annular groove communicating with the lubrication passage of the inner member.

8. The idler arrangement of claim 3 wherein the bearing means is a sealed anti-friction bearing.

* * * * *